(12) United States Patent
Köster

(10) Patent No.: US 9,718,223 B2
(45) Date of Patent: Aug. 1, 2017

(54) DEVICE FOR APPLYING A FOAMING REACTION MIXTURE

(71) Applicant: Covestro Deutschland AG, Leverkusen (DE)

(72) Inventor: Ralf Köster, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 177 days.

(21) Appl. No.: 14/372,040

(22) PCT Filed: Jan. 15, 2013

(86) PCT No.: PCT/EP2013/050672
§ 371 (c)(1),
(2) Date: Jul. 14, 2014

(87) PCT Pub. No.: WO2013/107739
PCT Pub. Date: Jul. 25, 2013

(65) Prior Publication Data
US 2014/0342090 A1 Nov. 20, 2014

(30) Foreign Application Priority Data

Jan. 16, 2012 (EP) .................................. 12151252
Jan. 23, 2012 (EP) .................................. 12152076

(51) Int. Cl.
*B29C 44/46* (2006.01)
*B05B 7/00* (2006.01)
(Continued)

(52) U.S. Cl.
CPC .......... *B29C 44/461* (2013.01); *B05B 7/0056* (2013.01); *B05C 5/025* (2013.01);
(Continued)

(58) Field of Classification Search
CPC ............................ B29C 44/461; B05B 7/0056
See application file for complete search history.

(56) References Cited

U.S. PATENT DOCUMENTS 2,098,523 A * 11/1937 Simning ............... E01C 19/176
239/159
4,201,150 A * 5/1980 Edwards ............... B05B 13/041
118/314
(Continued)

FOREIGN PATENT DOCUMENTS

DE 4243277 C1 1/1994
DE 202009015838 U1 3/2010
(Continued)

OTHER PUBLICATIONS

International Search Report for PCT/EP2013/050672 mailed Apr. 11, 2013.

*Primary Examiner* — Michael P Rodriguez
(74) *Attorney, Agent, or Firm* — K&L Gates LLP

(57) ABSTRACT

The invention relates to a device (100) for applying a foaming reaction mixture (600) onto a top layer (500), in particular for producing a composite element, comprising at least two casting rakes (200, 260), each of which comprises a tubular hollow body (210), said hollow body (210) extending along a central axis (250) and having at least two outlet openings (220) for discharging the foaming reaction mixture (600). The casting rakes (200, 260) and the top layer (500) can be moved relative to one another in a longitudinal axis (510), and the casting rakes (200, 260) are arranged on a receiving element (700). According to the invention, each arrangement of the casting rakes (200, 260) on the receiving element (700) has a joint (805), by means of which the casting rakes (200, 260) are movably arranged on the receiving element (700) and can be oriented at an angle (400, 410) of <=80 DEG relative to the longitudinal axis (510) of the movement.

19 Claims, 4 Drawing Sheets

(51) Int. Cl.
  *B05C 5/02*    (2006.01)
  *B05D 1/34*    (2006.01)
  *B05D 7/14*    (2006.01)
(52) U.S. Cl.
  CPC ............... *B05C 5/027* (2013.01); *B05D 1/34* (2013.01); *B05D 7/14* (2013.01)

(56) References Cited

U.S. PATENT DOCUMENTS

| | | | | |
|---|---|---|---|---|
| 5,411,389 | A | * | 5/1995 | Kellerhof ................ B29C 39/16 264/45.9 |
| 5,846,462 | A | * | 12/1998 | Thompson ............ B29C 44/352 261/DIG. 26 |
| 2007/0158474 | A1 | | 7/2007 | Berger |
| 2010/0080900 | A1 | * | 4/2010 | Geraedts ............... B29C 44/461 427/240 |
| 2014/0017412 | A1 | | 1/2014 | Schoen et al. |

FOREIGN PATENT DOCUMENTS

| | | |
|---|---|---|
| DE | 202011001109 U1 | 4/2011 |
| GB | 2317848 A | 4/1998 |
| WO | WO-9851465 A1 | 11/1998 |
| WO | WO-2008/018787 A1 | 2/2008 |
| WO | WO-2009/077490 A1 | 6/2009 |

\* cited by examiner

DEVICE FOR APPLYING A FOAMING REACTION MIXTURE

CROSS-REFERENCE TO RELATED APPLICATIONS

This application is a national stage application (under 35 U.S.C. §371) of PCT/EP2013/050672, filed Jan. 15, 2013, which claims benefit of European Applications No. 12151252.9, filed Jan. 16, 2012 and Ser. No. 12/152,076.1, filed Jan. 23, 2012, all of which are incorporated herein by reference in their entirety.

The invention relates to an apparatus for applying a foaming reaction mixture to a covering layer, in particular for producing a composite element. In addition, the invention relates to a process for producing composite elements containing PUR/PIR foam.

PRIOR ART

Composite elements made up of a covering layer and an insulating core are nowadays used in many fields of industry. The basic structure of such composite elements consists of a covering layer to which an insulating material is applied. As covering layers, it is possible to use, for example, sheets of coated steel, stainless steel, aluminum, copper or alloys of the latter two materials. However, polymer sheets or films, aluminum foils, glass fiber nonwovens or mineral fiber nonwovens and also cellulose-containing materials such as paper, paperboard or paper mache can also be used as covering layer materials. The choice of the suitable covering layer material depends on the intended use of the composite elements and the materials requirements resulting therefrom. Foams based on polyurethane (PUR) and/or polyisocyanurate (PIR), in particular, can be used as insulating core.

Apart from the use of such composite elements for the insulation of, for example, coolstores, these elements are evermore frequently employed as facing elements on buildings or as elements of industrial doors or, for example, sectional doors. Such composite elements, hereinafter also referred to as sandwich elements, display, due to their covering layer, a stability and surface configuration corresponding to the material used, while the applied foam makes appropriate thermal insulation properties possible.

To produce such composite elements, a foaming reaction mixture is applied by means of an application apparatus to a prepared covering layer. For this purpose, for example when using foams based on isocyanates, the appropriate polyol components and isocyanate components are mixed with one another and applied to the covering layer on which they foam and cure.

Tubular hollow bodies which are provided along their longitudinal extension with a plurality of outlet openings from which the reaction mixture introduced into the tube can exit are frequently used as application apparatus for applying the foaming reaction mixture to the covering layer. Such tubes are usually referred to as casting rakes.

To achieve very uniform distribution of the foaming reaction mixture on the covering layer, the distribution of the outlet openings along the longitudinal extension of the casting rake is appropriately optimized. To achieve an optimized distribution of the foaming reaction mixture along the longitudinal extension of the covering layer, too, the casting rake can be moved in an oscillating fashion over the covering layer or, as an alternative, the casting rake is mounted in a fixed manner and the covering layer is moved under the casting rake. This can be carried out either continuously or batchwise.

Thus, for example, WO 2009/077490 A1 discloses a process for producing composite bodies consisting of at least one covering layer and a rigid foam based on isocyanate, in which the covering layer is moved continuously and the starting material for the rigid foam based on isocyanate is applied to the covering layer, with the application of the liquid starting material for the rigid foam based on isocyanate occurring by means of at least one fixed tube which is arranged parallel to the plane of the covering layer and at right angles to the direction of motion of the covering layer and is provided with openings.

WO 2008/018787 A1 discloses an apparatus for applying a viscous mixture to a surface by means of one or more outlet openings, where the viscous mixture is fed by means of a tubular feed device to the apparatus.

The German utility model DE 20 2011 001 109 U1 discloses an apparatus for applying liquid reaction mixtures to a covering layer, where the covering layer is moved continuously and the liquid reaction mixture is applied to the covering layer, which apparatus consists of at least one tube which is provided with openings in the direction of the covering layer and which is arranged above the covering layer parallel to the plane of the covering layer and at right angles to the direction of motion of the covering layer, with the exterior openings on the side of the tube located above the edge of the covering layer being installed at an angle of from 1° to 50° in the direction of the edge of the covering layer.

The German utility model DE 20 2009 015 838 U1 discloses an apparatus for applying liquid reaction mixtures to a covering layer, where the covering layer is moved continuously and the liquid reaction mixture is applied to the covering layer and the apparatus is at least one tube provided with openings and the tube consists of plastic.

The known types of casting rakes can lead to the disadvantage that, depending on the shape and movement of the covering layer relative to the casting rake, uniform distribution of the reaction mixture is not advantageously possible. In particular, uniform distribution of the reaction mixture is not ensured in the side regions of the covering layer itself or at fastening elements present on the covering layer, for example in the side regions of the fastening elements.

DISCLOSURE OF THE INVENTION

It is therefore an object of the present invention to provide an improved apparatus for producing composite elements made up of a covering layer and a foam layer applied thereto, which apparatus allows, in particular, improved application of a foaming reaction mixture forming the foam.

This object is achieved by an apparatus for applying a foaming reaction mixture to a covering layer, in particular for producing a composite element, which at least comprises two casting rakes each having a tubular hollow body which extends along a central axis and has at least two outlet openings for exit of the foaming reaction mixture, where the casting rakes and the covering layer can be moved relative to one another along a longitudinal axis and the casting rakes are arranged on an accommodation element, and it is provided according to the invention that the attachment of the casting rakes to the accommodation element in each case has a joint by means of which the casting rakes are arranged movably on the accommodation element and can be directed at an angle of ≤80° relative to the longitudinal axis of motion.

It has surprisingly been found that even composite elements having a complicated geometry can be produced in a better way using a movable arrangement of the casting rakes, for example at an angle of ≤80° relative to the longitudinal axis. For example, it is possible in the case of a covered fastening of the composite element, as are provided, for example, in the case of facing elements, to ensure improved distribution of the foam on the covering layer in the side regions. A further advantage occurs in the production of composite elements having creases which, in particular, form a corrugated profile, as are used, for example, in the case of roof profiles. Here, the angular arrangement of the casting rake leads to optimal application of the foaming reaction mixture in the creases.

In a preferred embodiment of the invention, the accommodation element is formed by a mixing head, in particular having a 3-way piece, with at least two components for forming the foaming reaction mixture being able to be combined in the mixing head.

Furthermore, it is advantageously provided that the joint is, in particular, configured as a ball joint between the 3-way piece and the casting rakes in such a way that the casting rakes are attached mechanically movably via the 3-way piece to the mixing head and are connected fluidically to the mixing head.

The use of a flexible joint enables the casting rake to be aligned, for example, at an angle of <90° and preferably ≤80° to the longitudinal axis of motion of the covering layer or of the apparatus. The use of a flexible joint likewise makes it possible to align the casting rake at an angle from the horizontal, as a result of which the casting rake can be aligned antiparallel to the plane of the covering layer. It is also possible to align the outlet openings of the casting rake and thus the exit angle of the foaming reaction mixture flexibly relative to the axis orthogonal to the plane of the covering layer, so that the foaming reaction mixture impinges at an impingement angle which can be selected on the covering layer.

Basically, the covering layer is moved along under the casting rakes, for example continuously as continuous sheet of material, in order to apply a foaming reaction mixture. However, the indicated relative motion between the casting rakes and the covering layer can, for the purposes of the present invention, also be generated when the casting rakes are moved over a covering layer which is at rest or when both the casting rakes and the covering layer are moved.

For the purposes of the invention, the term "tubular" refers to any suitable hollow profile shape. In particular, hollow profiles having a round, elliptical or angular profile cross section and also conical hollow profiles are encompassed.

It has surprisingly been found that when the casting rake is arranged at an angle of ≤80°, even composite elements having a complicated or asymmetric geometry can be produced more readily. Such an alignment of the casting rakes relative to the covering layer is advantageously made possible by means of flexible joints allowing fluidic connection of the casting rakes via a 3-way piece. The flexible joint, which is preferably formed by a ball joint, allows alignment of the casting rakes with three degrees of freedom, as a result of which the casting rake can advantageously be aligned relative to the plane of the covering layer in such a way that the foaming reaction mixture is applied in an optimized manner to the covering layer.

For example, it is possible in the case of a covered fastening of the composite elements, as is provided, for example, in the case of facing elements, to ensure improved distribution of the foam on the covering layer in the side regions. A further advantage is obtained in the production of composite elements having creases, which, in particular, form a corrugated profile as is used, for example, as roof profiles. Here, the angular arrangement of the casting rake leads to optimized application of the foaming reaction mixture in the creases.

In a further embodiment of the apparatus of the invention, it can be provided that the absolute value of the angle at which the casting rakes are aligned relative to the direction of motion of the covering layer is different, so that the two casting rakes are arranged relative to one another in the form of an unsymmetrical V. This makes it possible, for example, in the case of a covered fastening of the composite element, as is provided, for example, in the case of facing elements, to ensure improved distribution of the foam on the covering layer in the side regions and to introduce more material into the long nose of the profile. A further advantage is obtained in the production of composite elements having creases, as are used, for example, as roof profiles. Here, the asymmetric arrangement of the casting rakes leads to optimized application of the foaming reaction mixture in the creases.

In a further development of the apparatus of the invention, casting rakes of differing length are attached to the flexible joints. This can be particularly advantageous in the production of composite elements having a creased or corrugated profile, since this arrangement makes it possible, for example, to adapt the position of the outlet openings to the position of the creases or corrugations.

In a further embodiment of the apparatus, a ball joint cup is provided on the feed line of the casting rakes for the foaming reaction mixture and a ball joint head corresponding to the ball joint cup is formed on the 3-way piece. As an alternative, a ball joint head can be formed on the feed line of the casting rake for the foaming reaction mixture and a ball joint cup corresponding to the ball joint head can be formed on the 3-way piece. The casting rakes in particular can have feed lines which in each case have a part of the ball joint, in particular a ball joint cup, with ball joint heads corresponding to the ball joint cup being formed on the 3-way piece.

In a further embodiment of the apparatus of the invention, the casting rakes can be aligned by means of the ball joint at an angle in the range from ≥60° to ≤80° to the longitudinal axis of motion. The two casting rakes can thus be arranged in a symmetric or asymmetric V shape and include an angle in the range from ≥120° to ≤160°. This allows, in particular, good application of foam to the covering layer even in the edge regions in the case of a complicated or asymmetric profile geometry of the covering layer, as occurs, for example, in the case of composite elements having covered fastenings.

Furthermore, it can preferably be provided that the ball joint head and the ball joint cup are detachably connected to one another in a fluid-tight manner via a coupling element. In this context, fluid-tight means that the two joint elements are pressed against one another in such a way that the foaming reaction mixture flowing through the ball joint formed cannot exit between joint cup and joint head. In this context, detachably means that the coupling element is configured in such a way that the ball joint formed can be opened in order to replace the casting rake and/or the 3-way piece if required.

A screw clamp or spring clamp can preferably be provided as coupling element. In the case of a screw clamp, a clamping force is exerted on the two joint elements of the ball joint by means of a threaded rod which engages in a corresponding threaded element, so that the two joint elements of the ball joint are pressed together. When a spring clamp is used, a corresponding clamping force is applied via a spring element.

In a further embodiment of the apparatus of the invention, the ball joint head and/or the ball joint cup have a sealing surface which ensures a fluid-tight connection between ball joint cup and ball joint head. In this context, sealing surface means that at least the contact areas between the joint cup and the joint head are configured so that an optimized seal between the joint elements is obtained on application of the clamping force by the coupling element. For this purpose, the contact surfaces can be surface-treated in a suitable way or provided with elastic sealing material.

As an alternative, the joint can also be configured as a purely mechanically acting connecting means and the fluid connection between the casting rakes and the mixing head is produced independently of the mechanical joint by means of, for example, a hose connection.

The feed line arranged on the casting rake and/or the joint element can be an integral part of the casting rake. For this purpose, the casting rake together with feed line and/or joint element can be made, for example, as injection-molded part. Likewise, the joints provided on the 3-way piece can be integral parts of the 3-way piece. When the casting rake and/or the 3-way piece are produced by means of, for example, an injection-molding technique, the joint can advantageously be provided as molded part of the casting rakes or of the 3-way piece and the casting rakes or the 3-way piece and also the joint element can be injection-molded together. In this case, a suitable plastic or a suitable metal or a suitable alloy can be used as material for producing the casting rake.

In a further preferred embodiment of the apparatus, the outlet openings are formed by exit tubes, with the length of the exit tubes preferably decreasing with increasing distance from the point at which the reaction mixture is fed from the feed line into the tubular hollow body. In this way, about the same mass flow of reaction mixture exits from each exit tube arranged on the tubular hollow body. It is likewise possible for the casting rakes to have a wider flow cross section and the different lengths of the exit tubes to be formed by drill holes of different lengths through the profile of the exit tubes. Likewise, the outlets of differing length can be provided directly during the manufacture of the casting rakes, for example by means of injection-molding techniques.

In a further embodiment of the invention, the internal diameter of the tubular hollow body can decrease from the feed line in the direction of the end of the casting rake. In this way, the uniformity of the exit rate of the foaming reaction mixture can likewise be increased in an advantageous way and the uniformity of the application of the reaction mixture on the covering layer can thus be improved.

In an embodiment of the invention, the mixing head can have at least two inlets for components of the foaming reaction mixture and an outlet which is fluidically connected to the casting rake. Thus, for example, it can be provided that a suitable polyol component is fed into the mixing head through one inlet and a suitable isocyanate component is fed in through a further inlet and these components are then mixed in the mixing head to form a foaming reaction mixture and the mixture is applied via the casting rake to the covering layer.

The foaming reaction mixture can, for example, contain a compound which is reactive toward polyisocyanates and a polyisocyanate. Suitable compounds which are reactive toward isocyanates are, in particular, polyols, polyamines, polyamino alcohols and polythiophenes.

Examples of polyamines are ethylenediamine, 1,2- and 1,3-diaminopropane, 1,4-diaminobutane, 1,6-diaminohexane, isophoronediamine, an isomer mixture of 2,2,4- and 2,4,4-trimethylhexamethylenediamine, 2-methylpentamethylenediamine, diethylenetriamine, 1,3- and 1,4-xylylenediamine, $\alpha,\alpha,\alpha',\alpha'$-tetramethyl-1,3- and -1,4-xylylenediamine and 4,4'-diaminodicyclohexylmethane, diethylmethylbenzenediamine (DETDA), 4,4'-diamino-3,3'-dichlorodiphenylmethane (MOCA), dimethylethylenediamine, 1,4-bis(aminomethyl)cyclohexane, 4,4'-diamino-3,3'-dimethyldicyclohexylmethane and 4,4'-diamino-3,5-diethyl-3',5'-diisopropyldicyclohexylmethane. Polymeric polyamines such as polyoxyalkylenamines are also suitable.

Examples of amino alcohols are N-aminoethylethanolamine, ethanolamine, 3-aminopropanol, neopentanolamine and diethanolamine.

Examples of polythiols are di(2-mercaptoethyl) ether, pentaerythrityl tetrakisthioglycolate, pentaerythrityl tetrakis(3-mercaptopropionate) and 1,2-bis((2-mercaptoethyl)thio)-3-mercaptopropane.

Polyol is preferably selected from the group consisting of polyether polyols, polyester polyols, polycarbonate polyols, polyether ester polyols and polyacrylate polyols, with, furthermore, the OH number of the polyol being from ≥100 mg KOH/g to ≤800 mg KOH/g, particularly preferably from ≥350 mg KOH/g to ≤650 mg KOH/g and the average OH functionality of the polyols being ≥2.

Polyols which can be used can, for example, have a number average molecular weight $M_n$ of from ≥60 g/mol to ≤8000 g/mol, preferably from ≥90 g/mol to ≤5000 g/mol and more preferably from ≥92 g/mol to ≤1000 g/mol. In the case of a single added polyol, the OH number indicates the OH number thereof. In the case of mixtures, the average OH number is reported. This value can be determined in accordance with DIN 53240. The average OH functionality of the polyols mentioned is ≥2, for example in a range from ≥2 to ≤6, preferably from ≥2.1 to ≤4 and more preferably from ≥2.2 to ≤3.

Polyether polyols which can be used are, for example, polytetramethylene glycol polyethers which can be obtained by polymerization of tetrahydrofuran by means of cationic ring opening.

Further suitable polyether polyols are addition products of styrene oxide, ethylene oxide, propylene oxide, butylene oxides and/or epichlorohydrin onto bifunctional or polyfunctional starter molecules.

Suitable starter molecules are, for example, ethylene glycol, diethylene glycol, butyl diglycol, glycerol, diethylene glycol, trimethylolpropane, propylene glycol, pentaerythritol, sorbitol, sucrose, ethylenediamine, toluenediamine, triethanolamine, 1,4-butanediol, 1,6-hexanediol and also low molecular weight, hydroxyl-containing esters of such polyols with dicarboxylic acids.

Polyester polyols which can be used are, inter alia, polycondensates of diols and also triols and tetrols with dicarboxylic and also tricarboxylic and tetracarboxylic acids or hydroxycarboxylic acids or lactones. The corresponding polycarboxylic anhydrides or corresponding polycarboxylic esters of lower alcohols can also be used instead of the free polycarboxylic acids for preparing the polyesters.

Examples of suitable diols are ethylene glycol, butylene glycol, diethylene glycol, triethylene glycol, polyalkylene glycols such as polyethylene glycol, also 1,2-propanediol, 1,3-propanediol, 1,3-butanediol, 1,4-butanediol, 1,6-hexanediol and isomers, neopentyl glycol and the neopentyl glycol ester of hydroxypivalic acid. It is also possible to use polyols such as trimethylolpropane, glycerol, erythritol, pentaerythritol, trimethylolbenzene or trishydroxyethyl isocyanurate.

As polycarboxylic acids, it is possible to use, for example, phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, succinic acid, 2-methylsuccinic acid, 3,3-diethylglutaric acid, 2,2-dimethylsuccinic acid, dodecanedioic acid, endomethylenetetrahydrophthalic acid, dimeric fatty acid, trimeric fatty acid, citric acid or trimellitic acid. The corresponding anhydrides can also be used as acid source.

If the average functionality of the polyol to be esterified is ≥2, monocarboxylic acids such as benzoic acid and hexanecarboxylic acid can additionally be concomitantly used.

Hydroxycarboxylic acids which can be concomitantly used as reaction participants in the preparation of a polyester polyol having terminal hydroxyl groups are, for example, hydroxycaproic acid, hydroxybutyric acid, hydroxydecanoic acid, hydroxystearic acid and the like. Suitable lactones are, inter alia, caprolactone, butyrolactone and homologues.

Polycarbonate polyols which can be used are hydroxyl-containing polycarbonates, for example polycarbonate diols. These can be obtained by reaction of carbonic acid derivatives such as diphenyl carbonate, dimethyl carbonate or phosgene with polyols, preferably diols.

Examples of such diols are ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethyl-1,3-pentanediol, dipropylene glycol, polypropylene glycols, dibutylene glycol, polybutylene glycols, bisphenol A and lactone-modified diols of the abovementioned type.

Polyether-polycarbonate diols can also be used instead of or in addition to pure polycarbonate diols.

Polyether ester polyols which can be used are those compounds which contain ether groups, ester groups and OH groups. Organic dicarboxylic acids having up to 12 carbon atoms are suitable for preparing the polyether ester polyols, preferably aliphatic dicarboxylic acids having from ≥4 to ≤6 carbon atoms or aromatic dicarboxylic acids, which are used individually or in admixture. Examples which may be mentioned are suberic acid, azelaic acid, decanedicarboxylic acid, maleic acid, malonic acid, phthalic acid, pimelic acid and sebacic acid and also, in particular, glutaric acid, fumaric acid, succinic acid, adipic acid, phthalic acid, terephthalic acid and isoterephthalic acid. As derivatives of these acids, it is possible to use, for example, their anhydrides and also their esters and monoesters with low molecular weight, monofunctional alcohols having from ≥1 to ≤4 carbon atoms.

As further component for preparing the polyether ester polyols, it is possible to use polyether polyols which are obtained by alkoxylation of starter molecules such as polyhydric alcohols. The starter molecules are at least bifunctional but can optionally also contain proportions of starter molecules having a higher functionality, in particular trifunctional starter molecules. Polyether ester polyols can be obtained by reaction of polycarboxylic anhydrides with diols and subsequent alkoxylation of the resulting compounds.

Starter molecules are, for example, diols having primary OH groups and number average molecular weights $M_n$ of preferably from ≥18 g/mol to ≤400 g/mol or from ≥62 g/mol to ≤200 g/mol, e.g. 1,2-ethanediol, 1,3-propanediol, 1,4-butanediol, 1,5-pentenediol, 1,5-pentanediol, neopentyl glycol, 1,6-hexanediol, 1,7-heptanediol, 1,8-octanediol, 1,10-decanediol, 2-methyl-1,3-propanediol, 2,2-dimethyl-1,3-propanediol, 3-methyl-1,5-pentanediol, 2-butyl-2-ethyl-1,3-propanediol, 2-butene-1,4-diol and 2-butyne-1,4-diol, ether diols such as diethylene glycol, triethylene glycol, tetraethylene glycol, dibutylene glycol, tributylene glycol, tetrabutylene glycol, dihexylene glycol, trihexylene glycol, tetrahexylene glycol and oligomer mixtures of alkylene glycols, e.g. diethylene glycol.

In addition to the diols, it is also possible to make concomitant use of polyols having number average functionalities of from >2 to ≤8, of from ≥3 to ≤4, for example 1,1,1-trimethylolpropane, triethanolamine, glycerol, sorbitan and pentaerythritol and also polyethylene oxide polyols started on triols or tetraols and having average molecular weights of preferably from ≥18 g/mol to ≤400 g/mol or from ≥62 g/mol to ≤200 g/mol. Preference is given to glycerol.

Polyacrylate polyols can be obtained by free-radical polymerization of hydroxyl-containing, olefinically unsaturated monomers or by free-radical copolymerization of hydroxyl-containing, olefinically unsaturated monomers with optionally other olefinically unsaturated monomers. Examples of monomers are ethyl acrylate, butyl acrylate, 2-ethylhexyl acrylate, isobornyl acrylate, methyl methacrylate, ethyl methacrylate, butyl methacrylate, cyclohexyl methacrylate, isobornyl methacrylate, styrene, acrylic acid, acrylonitrile and methacrylonitrile. Suitable hydroxyl-containing, olefinically unsaturated monomers are, in particular, 2-hydroxyethyl acrylate, 2-hydroxyethyl methacrylate, the hydroxypropyl acrylate isomer mixture obtainable by addition of propylene oxide onto acrylic acid and also the hydroxypropyl methacrylate isomer mixture obtainable by addition of propylene oxide onto methacrylic acid. Terminal hydroxyl groups can also be present in protected form. Suitable free-radical initiators are those from the group of azo compounds, for example azoisobutyronitrile (AIBN), or from the group of peroxides, for example di-tert-butyl peroxide.

Examples of suitable polyisocyanates are butylene 1,4-diisocyanate, pentane 1,5-diisocyanate, hexamethylene 1,6-diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof having any isomer content, cyclohexylene 1,4-diisocyanate, phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI) or higher homologues (polymeric MDI, pMDI), 1,3- and/or 1,4-bis(2-isocyanatoprop-2-yl)benzene (TMXDI), 1,3-bis(isocyanatomethyl)benzene (XDI), and also alkyl 2,6-diisocyanatohexanoates (lysine diisocyanates) having $C_1$-$C_6$-alkyl groups. Particular preference is given to a mixture of MDI and pMDI.

In addition to the abovementioned polyisocyanates, it is also possible to concomitantly use proportions of modified diisocyanates having uretdione, isocyanurate, urethane, carbodiimide, uretonimine, allophanate, biuret, amide, iminooxadiazinedione and/or oxadiazinetrione structures and also unmodified polyisocyanate having more than 2 NCO groups per molecule, for example 4-isocyanatomethyloctane 1,8-diisocyanate (nonane triisocyanate) or triphenylmethane 4,4',4"-triisocyanate.

It is possible for the number of NCO groups in the isocyanate and the number of the groups which are reactive toward isocyanates to be present in the reaction mixture in a number ratio of from ≥70:100 to ≤500:100. This parameter can also be in a range from ≥180:100 to ≤330:100 or else from ≥90:100 to ≤140:100.

The foaming reaction mixture can, for example, also comprise acrylamide, epoxides and/or phenol, melamine and/or urea-formaldehyde. Polyacrylamide, epoxy foams, phenolic resin foams, melamine resin foams or urea foams can be obtained in this way.

In a further embodiment of the apparatus of the invention, the outlet openings of the casting rakes are aligned at an angle of ≥5° to the axis orthogonal to the plane of the covering layer. In this way, the velocity at which the foaming reaction mixture impinges on the covering layer moving under the casting rakes can be reduced, as a result of which more uniform application of the mixture to the covering layer can advantageously be achieved. The outlet openings can also be directed against the relative motion between the covering layer and the casting rakes. In this way, the width of the impingement zone of the foaming reaction mixture on the covering layer is enlarged, so that the strands of the foaming reaction mixture flow together more quickly, which is advantageous at high production rates.

The outlet openings of the casting rakes are particularly preferably aligned at an angle of ≥5° and preferably at an exit angle of from 5° to 30° to the axis orthogonal to the plane of the covering layer. The fluidic connection of the casting rakes and the 3-way piece to form a ball joint and also the resulting degree of freedom around the longitudinal axis of the casting rakes make it possible to achieve such an alignment of the outlet openings relative to the plane of the covering layer in a simple way. Optimized impingement of the foaming reaction mixture on the covering layer can be achieved in this way. The joints can also be configured in such a way that the casting rakes are arranged in a pivotable fashion directly on the mixing head, so that a 3-way piece is not absolutely necessary or the 3-way piece can, for example, be integrated with the mixing head.

In addition, the invention also provides a process for producing a composite element, in which a foaming reaction mixture is applied by means of an apparatus of the above-described type to a moving covering layer.

PREFERRED EXAMPLE OF THE INVENTION

The invention is illustrated below with the aid of figures.

Figure 4:
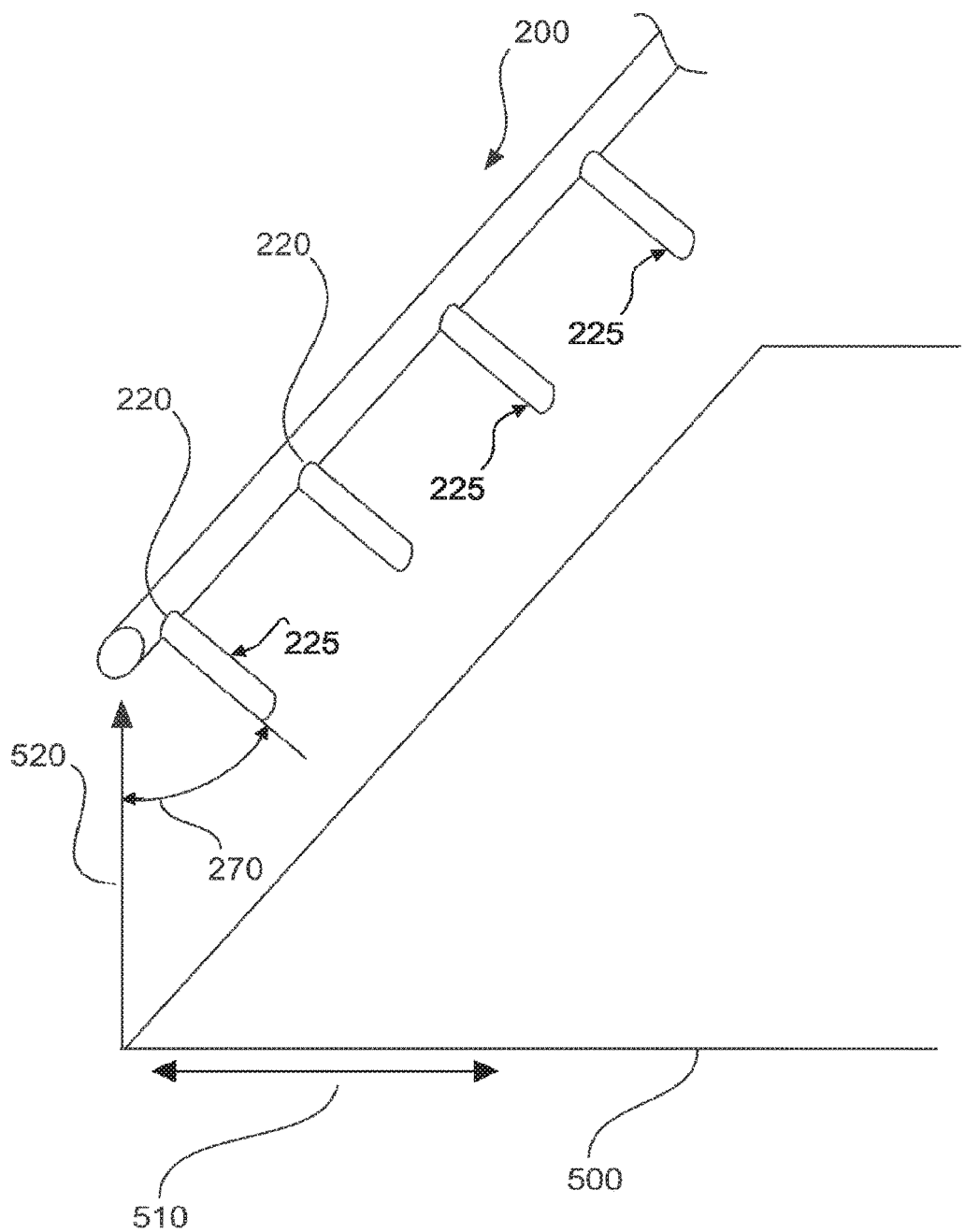
Figure 5A:
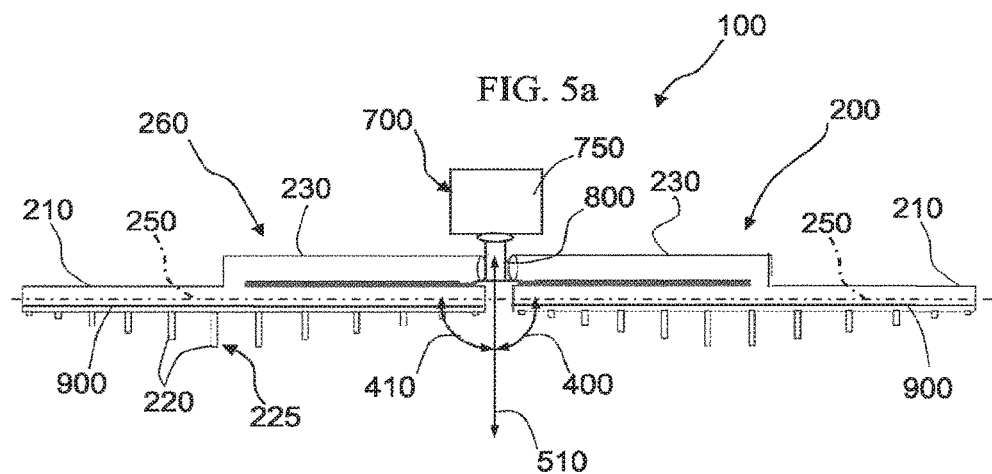
Figure 5B:
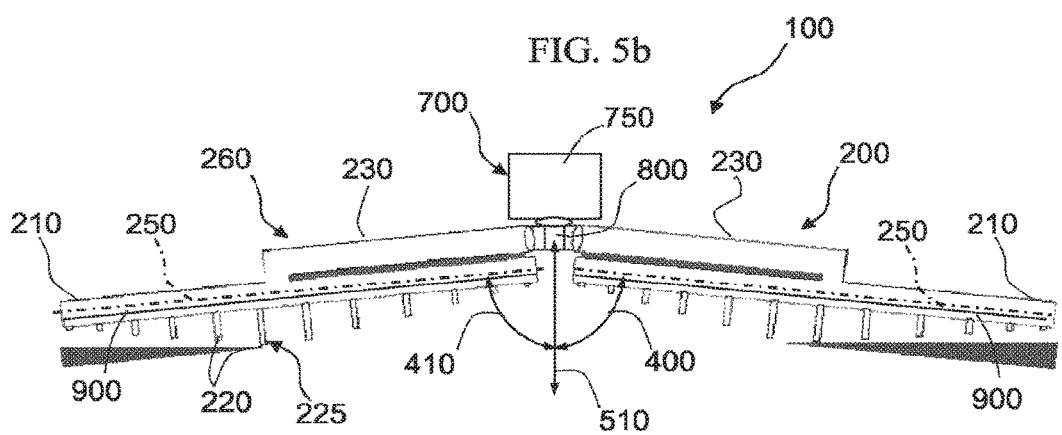

FIG. 4 schematically shows the outlet openings arranged, according to an embodiment of the invention, at an exit angle;

FIG. 5a shows a further example of the apparatus having two casting rakes which are each not inclined at the 3-way piece and FIG. 5b shows the apparatus having two casting rakes as per FIG. 5a, with the casting rakes being aligned in an inclined fashion on the 3-way piece.

Figure 1:
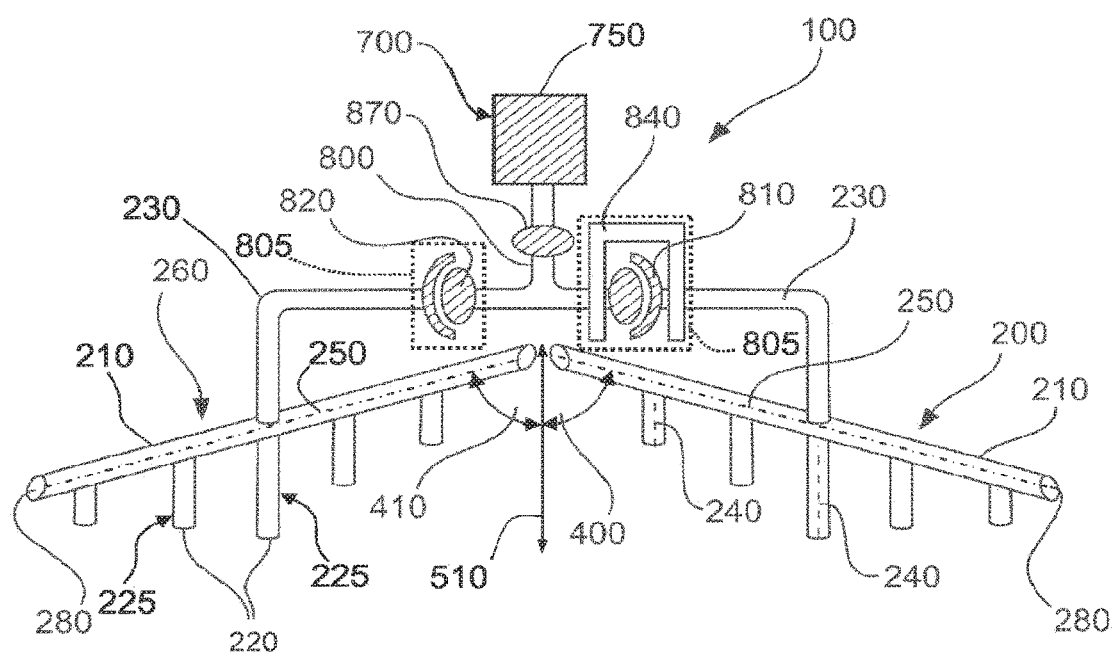
FIG. 1 shows an apparatus 100 for applying a foaming reaction mixture.
Figure 1A:
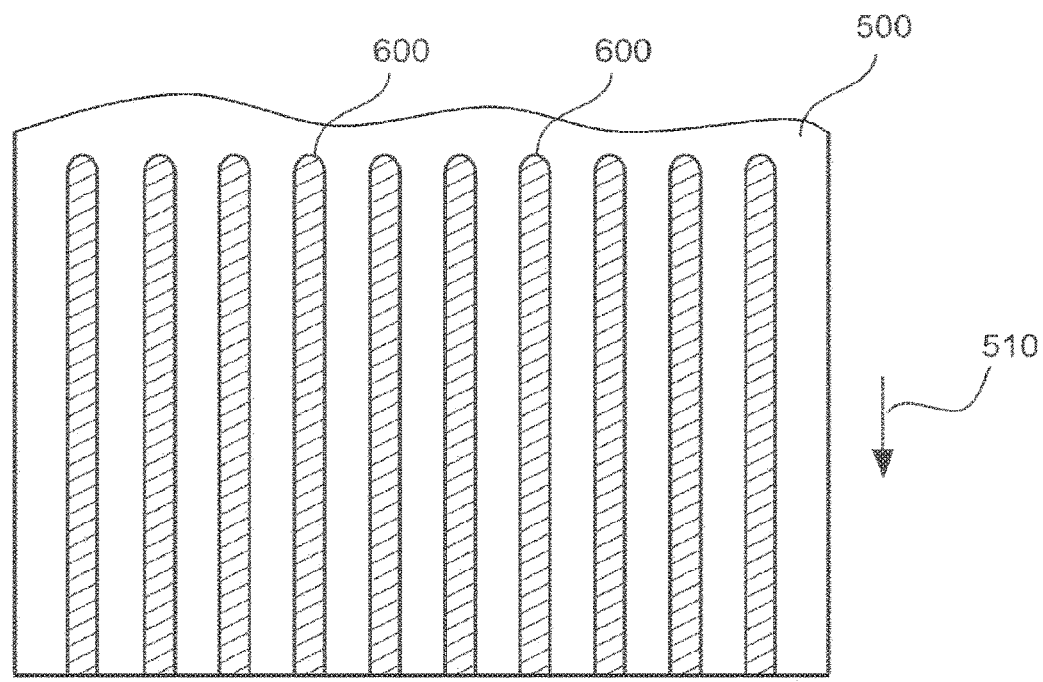
FIG. 1a shows a foaming reaction mixture 600 applied to a movably arranged covering layer 500.

FIG. 1 shows an apparatus 100 for applying a foaming reaction mixture 600 to a movably arranged covering layer 500. The apparatus 100 comprises, in the embodiment shown, two casting rakes 200, 260 each having a tubular hollow body 210. The tubular hollow body 210 has a plurality of outlet openings 220 configured as exit tubes 225 for exit of the foaming reaction mixture 600. The casting rakes 200, 260 are arranged at angles 400, 410 having an equal absolute value of ≤80° to the direction of motion 510 of the covering layer 500. The casting rakes 200, 260 each have a feed line 230 for introduction of the foaming reaction mixture 600 into the tubular hollow body 210. The feed lines 230 are fluidically connected via a 3-way piece 800 to an accommodation element 700 which at the same time serves as mixing head 750. The 3-way piece 800 is configured in the form of a ball joint head 820 at the points of connection to the feed lines 230, while the feed lines 230 are configured in the form of ball joint cups 810 at the points of connection to the 3-way piece 800, so that the ball joint head 820 and the ball joint cup 810 form, when assembled in a functional manner, a ball joint 805 through which a fluid can flow. As an alternative, the respective ball joint cup 810 can be formed on the 3-way piece 800 while the ball joint head 820 is in each case formed on the feed lines 230.

The 3-way piece 800 is mechanically and fluidically connected to the mixing head 750 by means of a threaded connection 870. As an alternative, the 3-way piece 800 can likewise be connected via a ball joint 805 to the mixing head 750, as a result of which further degrees of freedom in the alignment of the casting rakes 200, 260 relative to the covering layer 500 are obtained. For fixing the ball joints 805, coupling elements 840 which press the ball joint head 820 into the ball joint cup 810 by exertion of a clamping force are provided, so that a detachable, leak-free connection is formed; this is shown by way of example only on the right-hand side. The distance 240 between the central axis 250 of the tubular hollow body 210 and the outlet openings 220 decreases from the feed line 230 in the direction of the end 280 of the casting rakes 200, 260. The foaming reaction mixture 600 is fed to the casting rakes 200, 260 from the mixing head 750 via the feed lines 230 and exits through the exit tubes 225 from where the reaction mixture 600 impinges on the covering layer 500 and there swells and cures to form a foam.

Figure 2:
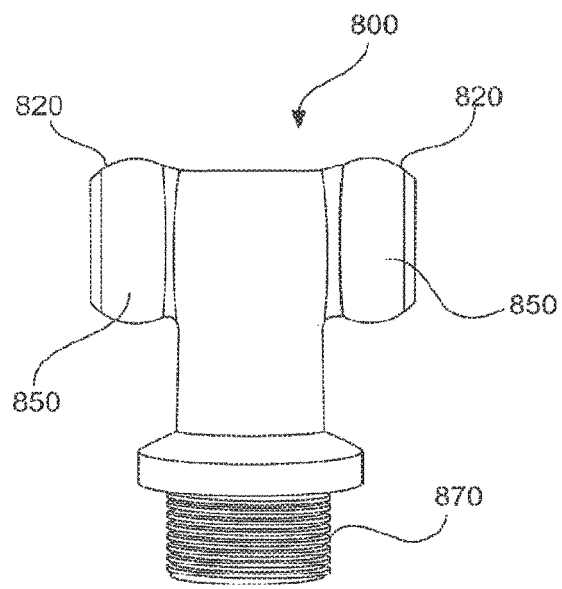
FIG. 2 shows a schematic detailed view of a 3-way piece for an apparatus according to the invention.

FIG. 2 shows a schematic detailed view of a 3-way piece 800 for an apparatus 100 according to the invention. The 3-way piece 800 has shaped elements which are configured as ball joint heads 820 on each of the points of connection to the feed lines to the casting rakes 200, 260. The ball joint heads 820 can have sealing surfaces 850 in the contact region in which they come into contact with the ball joint cups 810 formed on the feed lines to the casting rakes in order to increase the fluid-tightness of the ball joint 805 formed in respect of the foaming reaction mixture 600 flowing through this joint. The sealing surfaces 850 can be made of suitable sealing materials. To achieve the fluidic connection of the 3-way piece 800 to the mixing head 750, the former has a threaded connection 870.

Figure 3:
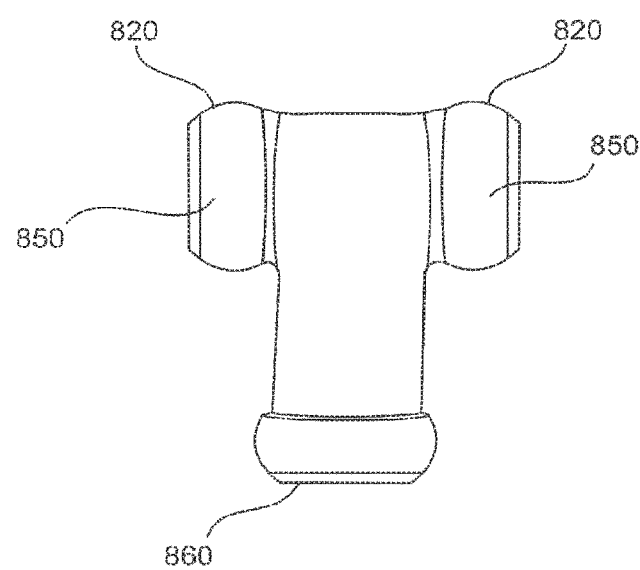
FIG. 3 shows a schematic detailed view of a further embodiment of a 3-way piece for an apparatus according to the invention.

FIG. 3 shows a schematic detailed view of a further embodiment of a 3-way piece 800 for an apparatus 100 according to the invention. The 3-way element 800 has shaped elements configured as ball joint heads 820 on each of the points of connection to the feed lines to the casting rakes. The ball joint heads 820 can have sealing surfaces 850 in the contact region in which they are in contact with the ball joint cups 810 formed on the feed lines to the casting rakes in order to increase the fluid-tightness of the ball joint 805 formed in respect of the foaming reaction mixture flowing through this joint. The sealing surfaces 850 can be made of suitable sealing materials. For the fluidic connection of the 3-way piece 800 to the mixing head 750, the former has a further ball joint 860 which is formed in an identical way to the connections with the feed lines to the casting rakes and serves to give a pivotable connection to the mixing head.

FIG. 4 schematically shows an embodiment of the invention in which outlet openings 220 configured as exit tubes 225 are arranged at an exit angle 270. The outlet openings 220 are arranged here at an angle 270 to the axis 520 orthogonal to the plane of the covering layer 500. The inclination is effected in such a way that the outlet openings 220 are directed in the direction of movement 510 of the movably arranged covering layer 500. This reduces the impingement velocity of the reaction mixture 600 on the covering layer 500, as a result of which more uniform swelling of the foaming reaction mixture can be achieved. This is particularly advantageous for the distribution of large amounts of reaction mixture. The outlet openings 220 can also be directed against the direction of motion 510 of the movably arranged covering layer 500. This increases the width of the impingement zone of the foaming reaction mixture 600, so that the strands of the foaming reaction mixture 600 flow together more quickly. This is, in particular, advantageous for the distribution of small amounts of foaming reaction mixture 600 and/or in the case of high production rates.

FIG. 5a shows a further example of the apparatus 100 with two casting rakes 200 and 260 which are each not inclined on the 3-way piece 800 which serves for pivotable attachment of the casting rakes 200 and 260 to the mixing head 750 which thus forms an accommodation element 700 for the casting rakes 200 and 260. The central axes 250 of the tubular hollow bodies 210 of the casting rakes 200 and 260 with the outlet openings 220 configured as exit tubes 225 coincide and extend in the same direction. This results in an angle 400, 410 between the direction of motion 510 and the central axes 250 of 90° in each case.

FIG. 5b shows the apparatus 100 with two casting rakes 200, 260 having the outlet openings 220 configured as exit tubes 225 as per FIG. 5a, with the casting rakes 200, 260 being aligned in an inclined fashion on the 3-way piece 800 on the accommodation element 700 configured as mixing head 750. The central axes 250 of the tubular hollow bodies 210 of the casting rakes 200, 260 here are therefore at an included angle 400, 410 of, for example, less than 80° to the direction of motion 510.

The example corresponding to FIGS. 5a and 5b of the apparatus 100 shows casting rakes 200 and 260 which have tubular hollow bodies 210 connected to the feed lines 230. The feed lines 230 run essentially parallel to the tubular hollow bodies 210. As a result of the approximately central introduction of the foaming reaction mixture from the feed lines 230 into the tubular hollow bodies 210, the feed lines 230 have about half the length of the tubular hollow bodies 210 and the feed lines 230 are, by way of example, integrated into the tubular hollow bodies 210. The feed lines 230 can, for example, be produced in a single-stage injection-molding step together with the tubular hollow body 210. The exit tubes 225 can be arranged on a common support strip 900. The support strip 900 with the exit tubes 225 can, for example, be clipped into the lower exit side of the tubular hollow bodies 210 so as to form a closed tubular hollow body 210.

LIST OF REFERENCE NUMERALS

100 Apparatus
200 Casting rake
210 Tubular hollow body
220 Outlet opening
225 Exit tube
230 Feed line
240 Length of outlet
250 Central axis of tubular hollow body
260 Second casting rake
270 Exit angle
280 End of the casting rake
400 Angle
410 Angle
500 Covering layer
510 Longitudinal axis, direction of motion
520 Orthogonal axis
600 Foaming reaction mixture
700 Accommodation element
750 Mixing head
800 3-Way piece
805 Joint, ball joint
810 Ball joint cup
820 Ball joint head
840 Coupling element
850 Sealing surface
860 Ball joint
870 Threaded connection
900 Support strip

The invention claimed is:

1. A process for producing a composite element, comprising applying a foaming reaction mixture to a moving covering layer with an apparatus, the apparatus comprising:
   an accommodation element;
   at least two casting rakes movably attached to the accommodation element, each casting rake having a tubular hollow body which extends along a central axis and has each casting rake having at least two outlet openings for exit of the foaming reaction mixture; and
   at least two joints by means of which the casting rakes are arranged movably on the accommodation element, each joint connecting a casting rake to the accommodation element;
   wherein the at least two casting rakes concurrently apply the foaming reaction mixture to the moving covering layer;
   wherein the at least two casting rakes and the covering layer move relative to one another along a longitudinal axis parallel to the direction of motion of the covering layer; and
   wherein the casting rakes are directed at an angle of ≤80° relative to the longitudinal axis.

2. The process as claimed in claim 1, wherein the foaming reaction mixture has an isocyanate-reactive component and an isocyanate component.

3. The process as claimed in claim 1, wherein the covering layer consists of a metal, a plastic, a glass fiber-containing material, a mineral fiber-containing material and/or a cellulose-containing material.

4. The process as claimed in claim 1, wherein:
the accommodation element comprises a mixing head and a 3-way piece, and at least two components for forming the foaming reaction mixture are combined in the mixing head, and
each joint comprising a ball joint that connects the 3-way piece and a casting rake, wherein the casting rakes are movably attached to the 3-way piece, and the casting rakes are fluidically connected to the mixing head.

5. The process as claimed in claim 4, wherein the casting rakes each have a feed line and each feed line is part of the ball joint, and wherein the ball joint includes a ball joint cup formed on the respective feed line, and a ball joint head corresponding to the ball joint cup formed on the 3-way piece.

6. The process as claimed in claim 4, wherein the casting rakes each have a feed line and each feed line is a part of the ball joint, and wherein each ball joint includes a ball joint head formed on the respective feedline and a ball joint cup corresponding to the ball joint head formed on the 3-way piece.

7. The process as claimed in claim 1, wherein the central axes of the casting rakes are aligned via the joint connected to each casting rake at an angle in the range from 60° to 80° relative to the longitudinal axis.

8. The process as claimed in claim 5, wherein the ball joint cup and the ball joint head are detachably joined to one another in a fluid-tight manner via a coupling element which comprises a screw clamp or a spring clamp.

9. The process as claimed in claim 5, wherein the ball joint cup and/or the ball joint head have a sealing surface which provides a fluid-tight connection between the ball joint cup and the ball joint head.

10. The process as claimed in claim 1, wherein the outlet openings are formed by exit tubes which are aligned at an exit angle of ≥5°, relative to an axis orthogonal to the moving covering layer.

11. The process as claimed in claim 1, wherein each of the joints comprises a ball joint.

12. The process as claimed in claim 1, wherein each of the joints are independently articulable to an angle of ≤80° relative to the longitudinal axis.

13. The process as claimed in claim 1, wherein the tubular hollow body of each casting rake comprises a support strip clipped into a lower exit side of the tubular hollow body so as to form a closed tubular hollow body.

14. The process as claimed in claim 13, wherein each casting rake comprises at least two exit tubes extending from the tubular hollow body, and wherein the exit tubes are arranged on the support strip.

15. The process as claimed in claim 1, wherein each casting rake comprises at least two exit tubes extending from the tubular hollow body, and wherein the at least two outlet openings are respectively located at ends of the at least two exit tubes opposite the tubular hollow body.

16. The process as claimed in claim 15, wherein the apparatus further comprises at least two feed lines, each feed line fluidly connecting the accommodation element to a casting rake, and wherein the feed lines connect to the casting rakes at a location intermediate the opposite ends of the tubular hollow body.

17. The process as claimed in claim 16, wherein the tubular hollow body and the feed line are integrally formed and run essentially parallel to each other.

18. The process as claimed in claim 1, wherein the foaming reaction mixture produces a polyurethane foam or a polyisocyanurate foam.

19. The process as claimed in claim 1, wherein the covering layer comprises a sheet, film, or foil made of a material selected from the group consisting of coated steel, stainless steel, aluminum, copper, an aluminum alloy, a copper alloy, a polymer, glass fibers, mineral fibers, paper, paperboard, and paper mache.

* * * * *